Nov. 26, 1968   H. A. FROMSON   3,412,783
ART OF CASTING FUSIBLE MATERIALS
Filed July 3, 1967

INVENTOR
HOWARD A. FROMSON

BY *Burgess, Ryan & Hicks*

ATTORNEYS

United States Patent Office 3,412,783
Patented Nov. 26, 1968

3,412,783
ART OF CASTING FUSIBLE MATERIALS
Howard A. Fromson, Rogues Ridge Road,
Weston, Conn. 06880
Continuation-in-part of application Ser. No. 412,448,
Nov. 19, 1964. This application July 3, 1967, Ser.
No. 650,740
6 Claims. (Cl. 164—122)

ABSTRACT OF THE DISCLOSURE

The disclosure relates to casting a body of fusible material in a unit having a mold and a reservoir connected together and tiltable about an axis of 90° or less. The mold has a mold cavity with an effective length greater than its effective depth, and the unit is turnable about an axis from an initial position with the mold elevated and the reservoir located below said mold. The material to be cast is teemed in the reservoir while the unit is in the initial position indicated and is turned about said axis through an angle of 90°, or less into casting position, in which the effective length of the mold extends substantially horizontal and its depth extends downward. During this turning operation, the material to be cast is transferred from the reservoir to the mold. During solidification, of the material in casting position of the unit, a heat shield is applied over the mold to inhibit and control heat radiation from the top surface of the body of material being cast, and is removed before the top of the body of material being cast is completely solidified.

---

Figure 1:
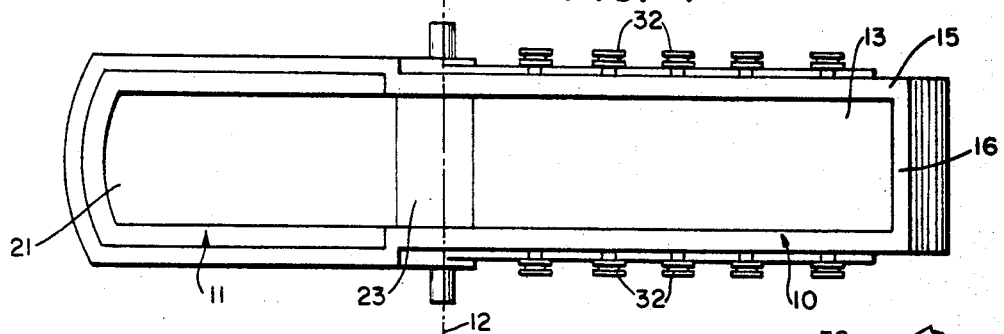

The present invention relates to a method of and apparatus for casting. The application is a continuation-in-part of copending application Serial No. 412,448 filed November 19, 1964, now U.S. Patent No. 3,333,625.

The aforesaid copending application discloses a process and apparatus in which a combined reservoir and mold forming an integrated unit has applied thereto a fusible mold or retaining material. This fusible mold material has a specific gravity lower than that of the material to be cast, and therefore, forms a liquid layer which floats on the surface of the fused material to be cast contained in the reservoir. While the material to be cast is in the reservoir, it is covered by the fused layer of mold material. Casting is effected by tilting the reservoir-mold unit through an angle to cause the liquid material to be cast to pass from the reservoir to the mold. During this transfer operation, the fused layer of mold material flows ahead of the material to be cast, to line the mold, so that the fused material to be cast, transferred to the mold will be encompassed by the fusible mold material. The excess mold material forms a liquid layer, which floats on the surface of the material being cast, thereby improving the surface quality of the casting and effecting other benefits to be described.

Metal shrinks about 4% when transformed from liquid to solid state. In the conventional process of making an ingot, the mold in the final casting position is upright with its greatest area dimension vertical. Shrinking of the metal in the form of an ingot during casting operations by such a process results in the formation of a cavity at the top of the ingot. If this ingot were rolled by application of rolling pressure against its longitudinal sides without cropping the shrinkage portion from the top of the casting, the casting would split and "fish-tail". To avoid this, it would be necessary to crop the cavity section of the ingot before rolling.

In accordance with the invention disclosed in the aforesaid copending application, in order to avoid the adverse conditions described, the combined reservoir and mold are arranged and constructed to turn about an axis as a unit less than 180° and preferably 90° or less, and to produce a casting in the form of a slab or sheet. This slab or sheet is cooled and cast while the greatest areal dimension of the body of material being cast is horizontal and at the top. Therefore, any shrinkage cavity formed on the top surface is distributed throughout a comparatively large area, and is almost insignificant when spread so thinly and widely. Moreover, since rolling pressure is applied to the faces of the slab presenting such comparatively large areas, whatever irregularities there may be on the surfaces due to shrinkage are rolled out. Therefore, no cropping is necessary and 100% recovery is attained.

Also, with the process described in the aforesaid copending application, it is easy to control the thickness of the slab cast with the same unit by merely controlling the amount of metal employed. Therefore, the amount of rolling necessary to form a thin sheet can be reduced by casting a correspondingly thin slab.

Moreover, with the combined reservoir and mold unit of the invention disclosed in the aforesaid copending application, since the unit is tilted less than 180° and preferably 90° or less, it is not necessary to provide a pit below the floor level to receive the mold in its final casting stage.

Also, with a tilt of 90° or less for the unit described, the molten metal or other material being cast flows from the reservoir to the mold during the entire tilting movement along an upwardly extending wall, so that teeming can be more easily controlled with minimum of agitation and creation of waves in the body of molten metal or other material being cast.

The process of the aforesaid copending application produces a metal plate or slab of high quality. However, when thick plates or slabs are produced, as for example, more than 4" thick, it becomes desirable to consider the matter of heat control and heat balance. While the mold is in final horizontal casting position, and before the metal being cast has solidified, mold material intermixed with the metal during the tilting operation, and any slag in the metal will rise in the metal towards the top surface. If the top of the mold is uncovered and the top surface of the metal being cast is permitted to cool rapidly by radiation, this top surface will solidify and if this solidification takes place before all of the slag and mold material has reached the top surface of the slab being cast, the slag and mold material will be entrapped in the slab below its surface. These segregated regions with high concentrations of unwanted non-metallic inclusions in the body of the slab, may be undesirable for certain uses of the slab.

In accordance with certain features of the present invention, in order to avoid the conditions described, a heat shield is provided over the mold while in horizontal final casting position, to minimize heat radiation from the upper surface of the metal being cast and to maintain thereby the upper regions of the metal fluid for a sufficient period to permit the slag and other undesirable non-metallic substances mixed with the metal to rise to the surface. This heat shield is desirably applied to the mold during only a part of the solidification period. Solidification takes place from the bottom up in the metal. If the heat shield is maintained on the mold until the metal completely solidifies, solidification will be accompanied by the formation of tree-like crystals or grains, and the peaks of the grains will project above the top surface of the slab. When this slab is rolled, these grain peaks will be bent over and will overlap, forming thereby a somewhat herringbone configuration on the surface of the slab, which may not be desirable, according to the intended uses for the slab.

To avoid the grain formation described, the heat shield is removed from the mold after the slag and undesirable non-metallic inclusions, such as the mold material intermixed with the metal being cast, having floated to the top surface of the body of metal, but while the metal in this surface is still in liquid form. This causes the metal in the mold to solidify from the top down, while the metal is also solidifying from the bottom up, thereby locating the plane of the thermal center where the two solidification fronts meet intermediate the top and bottom surfaces of the slab formed. The peaks of the grains or crystals are located in this solidification confrontation plane and, therefore, are protectively enclosed against disfigurement by rolling. With proper heat control, the height of the plane of the thermal center can be predetermined. In most cases, it is desirable to locate this plane of the thermal center substantially midway between the top and bottom surfaces of the metal in the mold.

Figure 2:
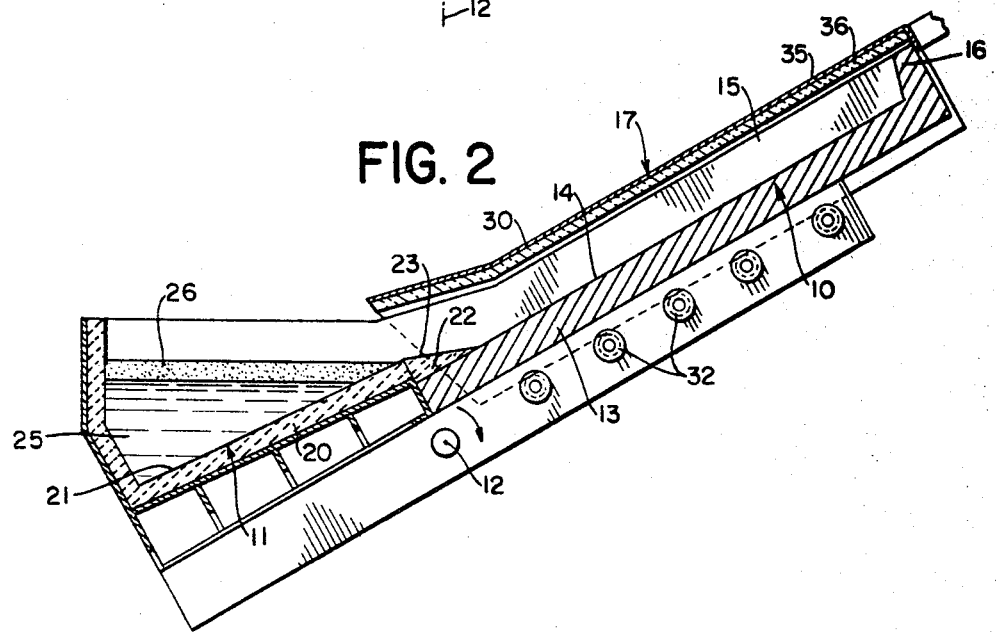
Figure 3:
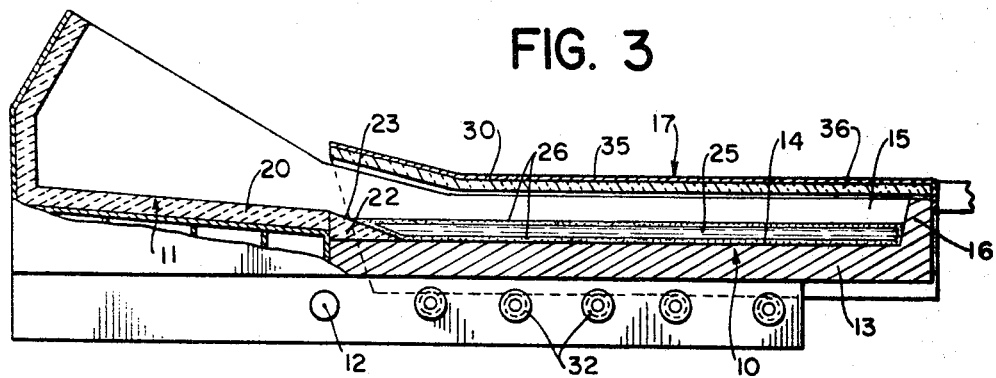

Other objects, features and advantages of the present invention are apparent from the following description and from the accompanying drawings, in which FIG. 1 is a top plan view of an apparatus, which comprises a reservoir and a mold connected together for tilting movement in unison and which is shown without the heat shield, said apparatus embodying certain structural features of the present invention and being suitable for carrying out the process of the present invention;

FIG. 2 is a vertical longitudinal section through the center of the apparatus, shown in initial elevated position just after the fused metal to be cast has been teemed into the reservoir and has been covered with a layer of mold material, and just before the apparatus has been tilted into casting position and also shown with the heat shield in position; and FIG 3 is a section of the apparatus similar to that indicated in FIG. 2, but shown in final horizontal casting position in which the molten metal to be cast has been transferred from the reservoir to the mold, and the metal is solidifying into a slab.

Referring to the drawings, there is shown a reservoir-mold unit with a section 10 at one end, serving as a mold, and a reservoir 11 at the other end. The reservoir-mold unit is arranged to be titlted 90° or less, about an axis 12 from initial teeming position shown in FIG. 2, to final horizontal casting position shown in FIG. 3. In the specific form shown, the angle of tilt is about 30°.

The mold 10 has a bottom wall 13 presenting a supporting surface 14, side walls 15 and an end wall 16, and is open at the top except for a removable shield 17, which is in mold closure position shown in FIGS. 2 and 3 only during certain phases of operation of the process of the present inventin to be described.

The reservoir 11 has a bottom wall 20 presenting a supporting surface 21 almost parallel to the supporting surface 14 of the mold 10 but at a higher elevation. This reservoir wall 20 connects at its end nearest the mold 10 to a wall piece 22 with a sloping surface 23 interconnecting the two surfaces 21 and 14, to afford smooth transfer of molten metal from the reservoir 11 to the mold 10 with minimum of turbulence, as the mold-reservoir unit is tilted clockwise about the axis 12 from the position shown in FIG. 2 to the final casting position shown in FIG. 3, and to serve as an end wall for the mold 10 in horizontal casting position shown in FIG. 3.

At the beginning of the operation the reservoir-mold unit is in the initial tilted elevated position shown in FIG. 2, with the reservoir 11 in the lowermost position and in empty condition. In this position of the reservoir-mold unit, the material 25 to be cast, which is desirably fused metal, and more specifically a ferrous composition, such as steel, is introduced into the empty reservoir 11, and then a layer of fusible mold material 26 deposited on the surface of this material 25. This mold material 26 (1) is immiscible with the molten material 25 to be cast, (2) is in liquid form or becomes liquid by contact with the hot material 25 to be cast, and (3) is of a density lower than that of the material 25 to be cast, so that it will float on the surface of this material to be cast. If desired, this mold material 26 can be introduced into the reservoir 11, while this reservoir is empty, and the molten material 25 to be cast can be poured into the reservoir over the layer of mold material 26. The fused mold material 26 will rise to the surface of the material 25 to be cast and will float thereon. However, because of the tapering shape of the reservoir 11, the better expedient is to apply the mold material 26 to the material 25 to be cast after the latter material has been deposited in the reservoir.

The particular fusible mold material 26 which is employed in accordance with the present invention is determined by the characteristics of the material 25 to be cast. In any case, it must have the following characteristics:

(1) A solidification temperature lower than that of the material 25 being cast.

(2) A thermal conductivity which is low relative to the thermal conductivity of the solid wall material of the mold 10.

(3) Immiscibility when in the fused state with the material 25 being cast.

(4) Non-volatility or low volatility at the maximum temperature to which it is heated during the casting operation.

(5) Chemical non-reactivity with the material 25 being cast and with the wall material of the mold 10.

It has been found in accordance with the present invention that inorganic salts, mixtures of inorganic salts, inorganic oxides and mixtures of inorganic oxides are generally suitable compounds from which to select a satisfactory mold material. Examples of salts which may be used are barium chloride, barium fluoride, cadmium fluoride, calcium chloride, calcium fluoride, copper chloride, lead chloride, lead fluoride, lithium bromide, lithium chloride, magnesium chloride, magnesium fluoride, potassium bromide, potassium chloride, potassium fluoride, silicon oxide, silver chloride, sodium chloride, sodium cyanide, cryolite (sodium aluminum fluoride), borax, or mixtures thereof.

It has been made apparent from the foregoing discussion that the essential requirements of the present invention is that the fusible mold material 26 with its melting point below the solidification of the material 25 to be cast must be adequately cooled by the solid walls of the mold 10 so that the temperature of the interface between the fusible mold material 26 and the solid supporting surface of the mold wall will never, for any reason, reach the melting point of the fusible mold material 26.

Any solid material having high thermal conductivity and good structural strength is suitable for use as the backing solid for the mold 10. The mold walls in accordance with the present invention may comprise a backing solid having a high capacity to absorb heat, as well as high thermal conductivity, this capacity being present in an amount to absorb the total heat of fusion of the material 25 being cast together with any super heat carried thereby, while maintaining its solid supporting surface in contact with the fusible mold material 26, below the melting point of this mold material. This form of mold has no provision for forced cooling, as by means of a circulating coolant.

An alternative form of mold is provided with means for force cooling the mold 10, as for example, by means of cooling pipes or ducts for fluid coolant, embedded or located in the solid walls of said mold. The solid parts of the mold wall would still be of higher thermal conductivity than the fusible mold material 26, but it need not have high heat capacity. The forced cooling capacity of the solid parts of the mold walls must be adequate to remove heat from the backing solid at a rate which keeps its solid supporting surface below its own melting point and below that of the mold material 26 in contact with said supporting surface.

The structural metals are generally suitable for use as the solid parts of the mold wall where forced cooling is employed. In the form of mold illustrated, where no means for forced cooling is provided, the particular metal used must be selected in view of the thermo-dynamic characteristics of the material 25 which is cast in the mold 10 and of the casting operation itself. Copper, the various alloys of copper, aluminum and aluminum alloys, silver and silver alloys, steel and cast iron are particularly suitable for this purpose, because of their relatively high thermal conductivity, high capacity to absorb heat, and good structural characteristics. Graphite is also a suitable material for the backing solid of the mold 10 and can be used even in the casting of the steel, since the fusible mold material 26 prevents the steel from picking up the graphite. It has been found in accordance with the present invention that copper and its various alloys are widely useful as the backing solid of the mold.

The walls of the reservoir 11 desirably should not be of high thermal conductivity, where it is intended to maintain the material in the reservoir for any period of time, as for example, to permit it to settle into a quiescent state before transfer to the mold 10, since such delay in transfer operations would initiate solidification in the part of the reservoir-mold unit not desired. For that purpose, the walls of the reservoir 11 may be made of refractory material having low thermal conductivity, or of cast steel with a refactory lining as shown. Due to the low heat conductivity of the refractory material on the walls of the reservoir 11, the mold material 26 does not solidify thereon.

With the reservoir filled with the fused material 25 to be cast, and the fused mold material 26 floating thereon, and while the reservoir-mold unit is in the elevated tilted position shown in FIG. 2, the heat shield 17 is placed over the mold 10. This heat shield 17 may be in the form of a hood with a top wall 30 closing the open top of the mold 10 and side walls 31 flanking the side walls of the mold and resting on rollers 32 mounted on the frame structure of the reservoir-mold unit, to permit easy placement or removal of said heat shield.

The heat shield 17 is designed and constructed to retain in the mold 10 the heat radiated from the surface of the molten material 25 to be cast, when said material has been transferred from the reseervoir 11 to the mold by the tilting of the reservoir-mold unit clockwise about the axis 12, from the position shown in FIG. 2 to the position shown in FIG. 3. In the specific form shown, the heat shield 17 has a metal plate backing 35 on its top wall 30, lined with a heat insulating layer 36, made, for example, of refractory material or asbestos. As another alternative, the heat shield 17 may comprise a metal plate for its top wall with an internal highly polished heat reflecting surface. A highly polished aluminized steel plate would serve the purpose of preventing the rapid cooling by radiation of the surface of the material 25 being cast.

In carrying out the process of the present invention, the reservoir-mold unit, set up in the condition and in the initial tilted position shown in FIG. 2, is turned clockwise about the pivot axis 12 into the horizontal casting position shown in FIG. 3. The angle that the reservoir-mold unit is turned between the positions of FIG. 2 and FIG. 3, is about 30° in the specific embodiment of the invention shown in the drawings. This tilt is effected slowly to prevent undue turbulence in the materials being transferred, and in a specific form may take a minimum of about nine seconds. During this tilting movement of the reservoir-mold unit, the material 25 to be cast is transferred from the reservoir 11 to the mold 10, but during this transfer, the layer of liquid mold material 26 flowing in advance of the material 25 to be cast, lines the walls of the mold. When the reservoir-mold unit reaches the final horizontal casting position shown in FIG. 3, there is formed in the mold 10, a body of material 25 to be cast, in the form of a slab, and this body of material will be surrounded on all sides including the top horizontal surface with a layer of the mold material 26. In this final position, the material 25 to be cast is permitted to solidify under the protective and beneficial action of the blanketing mold material 26, but the radiation of heat from the top surface of the material 25 being cast is inhibited by the heat shield 17 to maintain the upper portion of the material 25 being cast in liquid form for sufficient time to permit slag or any of the mold material 26 which has become intermixed with this material 25 to rise through said material 25 to the surface thereof without entrapment.

Before final solidification of the material 25 being cast takes place, the heat shield 17 is removed, to permit substantially uninhibited radiation of heat from the top surface of this material. The top surface of the material 25 starts to solidify and this solidification progresses downwardly, while solidification initiated at the bottom of the material progresses upwardly, until the two solidification fronts meet at the thermal center of the material at a plane between the bottom and top surfaces of the material. This prevents the formation of grains in the material 25 cast, with peaks projecting from the top surface of the material.

In the specific process described, the heat shield 17 has been applied while the reservoir-mold unit is in the tilted position shown in FIG. 2, but may be applied after the unit has been turned to the final casting position shown in FIG. 3, before solidification of the material 25 to be cast has set in.

The mold 10 has an effective length substantially greater than its effective depth, so that in final casting position shown in FIG. 3, the top horizontal surface of the body of material 25 being cast extends along the length of the mold and constitutes the slab surface presenting the largest area, and the depth of the mold for that particular casting operation is vertically downward from said horizontal surface. The advantages of having the greatest areal dimension of the material being cast horizontal during final casting operations have been pointed out.

The fusible mold material 26 applied in the manner described provides lubrication to mold-casting material interface, thereby reducing the shear forces associated with differential thermal contraction of the casting and expansion of the mold.

Also, the fusible mold material 26 performs two important thermal functions.

(a) The initial rate of heat transfer from the material 25 to be case to the solid backing material of the mold 10 is less than would be the case if the fusible mold material were not present. This significantly extends the life of the solid backing material of the mold 10.

(b) Heat transfer during the later stages of solidification is greater than would be the case if no fusible mold material 26 were used, because the liquid part of the mold form defined by this mold material maintains intimate wetted contact between the casting and the mold (i.e. there is no air gap). This results in increased solidification and higher production rates.

The presence of a substantial quantity of fused mold material 26, which is immiscible with and of lower density than the material 25 being cast, floating on the material being cast, inhibits any tendency toward uncontrolled flow of the material being cast, as the unit is tilted from initial position shown in FIG. 2 to final casting position shown in FIG. 3.

While the invention has been described with particular reference to a specific embodiment, it is to be understood that it is not to be limited thereto but is to be construed broadly and restricted solely by the scope of the appended claims.

What is claimed is:

1. The method of casting in a mold shaped to define a mold cavity with an effective length substantially greater than its effective depth, comprising depositing in a reservoir rigid with the mold and forming a unit therewith, a body of fused material to be cast, turning the unit about an axis to cause the body of fused material to be transferred from said reservoir to said mold until said unit is in casting position with the top horizontal surface of the body of fused material extending along the length of the mold and the depth of the mold extending vertically downward from said horizontal surface, shielding the upper surface of the body of material in said mold against heat radiation, while the upper part of said body of fused material is still in liquid form, terminating said shielding while the upper part of said body of fused material is still in liquid form to permit heat radiation from said horizontal surface, and allowing the unshielded material to be cast to completely solidify in said mold while said unit is in said casting position.

2. The method according to claim 1, said fused material to be cast being collected in said reservoir with a layer of fusible mold material floating on the top surface thereof and having (1) a solidification temperature lower than that of the material to be cast, (2) a thermal conductivity less than that of the wall of the mold adjacent its supporting matrix surface, (3) immiscibility with the fused material to be cast when said mold material is in fused state, (4) low volatility at the maximum temperature to which the mold material will be subjected during casting, (5) chemical non-reactivity with the material being cast and with wall material of the mold adjacent to its supporting surface, and (6) a specific gravity when fused less than that of the fused material to be cast, said fused material to be cast during the turning operation being transferred to the mold with the floating layer of mold material flowing in advance of the material to be cast to line the inner surfaces of said mold before the material to be cast reaches said mold, whereby there is formed between said mold surfaces and the body of fused material to be cast a layer of said mold material.

3. The method according to claim 2, wherein said reservoir and said mold are opposite end sections of the unit, and said unit is turned through an angle no more than 90°.

4. The method according to claim 2, wherein the fused material to be cast is a metal.

5. The method according to any one of claim 2, wherein said mold material is of the class consisting of barium chloride, barium fluoride, cadmium fluoride, calcium chloride, calcium fluoride, copper chloride, lead chloride, lead fluoride, lithium bromide, lithium chloride, magnesium chloride, magnesium fluoride, potassium bromide, potassium chloride, potassium fluoride, silicon oxide, silver chloride, sodium chloride, sodium cyanide, cryolite, borax and mixtures thereof.

6. The method described in claim 2, wherein said material to be cast is a metal and said heat shielding operation occurs for a period sufficiently long to permit substantially all of the slag and mold material intermixed with the material to be cast to rise therein to the surface, but not long enough to prevent the solidification fronts progressing from the top and bottom surfaces of the body of the material to be cast from meeting in a plane spaced from said top and bottom surfaces.

References Cited

UNITED STATES PATENTS

| | | | |
|---|---|---|---|
| 331,437 | 12/1885 | Platt | 249—137 |
| 1,393,216 | 10/1921 | Gutmueller | 249—137 |
| 1,943,026 | 1/1934 | McCreary et al. | 249—137 XR |
| 1,314,275 | 8/1919 | LeCrone | 164—141 |
| 1,189,149 | 6/1916 | McNaughton | 164—141 |
| 2,064,734 | 12/1936 | Crawford | 164—336 |
| 2,333,286 | 11/1943 | Wessel | 164—336 |
| 2,429,145 | 10/1947 | Wessel | 164—336 |

FOREIGN PATENTS

| | | |
|---|---|---|
| 348,398 | 5/1931 | Great Britain. |
| 597,271 | 5/1934 | Germany. |
| 200,068 | 9/1907 | Germany. |

J. SPENCER OVERHOLSER, *Primary Examiner.*

V. K. RISING, *Assistant Examiner.*